(12) United States Patent
Vander Mey et al.

(10) Patent No.: US 9,893,902 B2
(45) Date of Patent: Feb. 13, 2018

(54) MUTING PARTICIPANTS IN A COMMUNICATION SESSION

(75) Inventors: Christopher David Vander Mey, Seattle, WA (US); Karl Martin Ohman, Stockholm (SE); Serge Lachapelle, Vallentuna (SE); Justin Russell Uberti, Kirkland, WA (US)

(73) Assignee: Google LLC, Mountain View, CA (US)

( * ) Notice: Subject to any disclaimer, the term of this patent is extended or adjusted under 35 U.S.C. 154(b) by 633 days.

(21) Appl. No.: 13/484,128

(22) Filed: May 30, 2012

(65) Prior Publication Data

US 2012/0308044 A1 Dec. 6, 2012

Related U.S. Application Data

(60) Provisional application No. 61/491,786, filed on May 31, 2011.

(51) Int. Cl.
*H04M 3/42* (2006.01)
*H04L 12/18* (2006.01)
(Continued)

(52) U.S. Cl.
CPC .... *H04L 12/1822* (2013.01); *H04L 29/06374* (2013.01); *H04L 29/06428* (2013.01); *H04M 3/566* (2013.01); *H04L 12/1827* (2013.01)

(58) Field of Classification Search
CPC ............ H04L 12/1822; H04L 12/1827; H04L 29/06428; H04L 29/06374; H04M 3/566
(Continued)

(56) References Cited

U.S. PATENT DOCUMENTS 7,269,252 B2 * 9/2007 Eran .................. 379/202.01
7,317,791 B2 1/2008 Carlson
(Continued)

FOREIGN PATENT DOCUMENTS

CN 1653433 A 8/2005
CN 1964397 A 5/2007
(Continued)

OTHER PUBLICATIONS

"Scopia Desktop." Radvision, Apr. 2007. <http://www.gisolutions.com/PDF/Radvision/SCOPIA_Desktop_Datasheet.pdf>.*
(Continued)

*Primary Examiner* — Duc Nguyen
*Assistant Examiner* — Kile Blair
(74) *Attorney, Agent, or Firm* — Shumaker & Sieffert, P.A.

(57) ABSTRACT

Techniques for muting participants in a communication session are described. A communication session, such as a teleconference or a video conference, may be established between a plurality of participants using devices. Each participant engaged in the communication session may be authorized to mute or un-mute other participants. Information related to the communication session may be provided to some of the participants, including but are not limited to, indications of when a participant is muted or unmuted, indications of which participant initiated a muting or un-muting, indications of volume of a participant, or indications of types of sounds in a communication session. Social controls, utilized through transparency (e.g., providing identifying indications), may reduce the chance of misuse of the muting functionality.

20 Claims, 5 Drawing Sheets

(51) Int. Cl.
*H04M 3/56* (2006.01)
*H04L 29/06* (2006.01)

(58) Field of Classification Search
USPC ............ 379/202.01, 203.01, 204.01, 206.01
See application file for complete search history.

(56) References Cited

U.S. PATENT DOCUMENTS

| | | | |
|---|---|---|---|
| 7,739,109 B2 | 6/2010 | Rui | |
| 7,843,486 B1 | 11/2010 | Blair et al. | |
| 8,218,751 B2* | 7/2012 | Hepworth | H04M 3/42365 |
| | | | 370/260 |
| 8,275,843 B2* | 9/2012 | Anantharaman | H04M 3/568 |
| | | | 709/206 |
| 8,937,888 B2* | 1/2015 | Foo | H04L 12/1822 |
| | | | 370/260 |
| 9,374,453 B2* | 6/2016 | Kreiner | H04M 3/2227 |
| 2004/0006595 A1 | 1/2004 | Yeh et al. | |
| 2005/0151836 A1* | 7/2005 | Ni | H04N 7/147 |
| | | | 348/14.09 |
| 2006/0098798 A1 | 5/2006 | Krasnansky | |
| 2006/0114884 A1 | 6/2006 | Remaker | |
| 2006/0235932 A1 | 10/2006 | Celi, Jr. et al. | |
| 2007/0117508 A1* | 5/2007 | Jachner | 455/3.06 |
| 2008/0010347 A1 | 1/2008 | Houghton et al. | |
| 2008/0043986 A1 | 2/2008 | Darby | |
| 2008/0232277 A1 | 9/2008 | Foo et al. | |
| 2009/0006555 A1 | 1/2009 | Curran et al. | |
| 2010/0080374 A1 | 4/2010 | Hepworth et al. | |
| 2010/0322387 A1* | 12/2010 | Cutler | 379/32.01 |
| 2012/0144320 A1* | 6/2012 | Mishra | H04N 7/155 |
| | | | 715/753 |

FOREIGN PATENT DOCUMENTS

| | | |
|---|---|---|
| CN | 101438559 A | 5/2009 |
| CN | 101715013 A | 5/2010 |
| EP | 2237533 A1 | 6/2010 |
| WO | 03098849 A2 | 11/2003 |
| WO | 2007132149 A2 | 11/2007 |

OTHER PUBLICATIONS

"Conferencing Scenario Call Flows in Office Communications Server 2007 R2," Microsoft 2011 (online). First accessed on Mar. 11, 2011. Retrieved from the Internet: <http://technet.microsoft.com/en-us/library/dd572482> 5 pp.

Mor, "RADVISION Launches First iPad App for Video Conferencing," The Wadi, Jul. 21, 2010 [online]. Retrieved from the Internet: <http://www.thewadi.com/radvision-launches-first-ipad-app-for-video-conferencing/> 5 pp.

"SCOPIA Control," RADVISION 2011 [online]. First accessed on Mar. 11, 2011. Retrieved from the Internet: <http://www.radvision.com/Products/Video-Conference-Systems/Conference-Room-System> 1 pp.

International Search Report and Written Opinion of international application No. PCT/US2012/040025, dated Feb. 19, 2013, 10 pp.

International Preliminary Report on Patentability from International application No. PCT/US2012/040026, dated Dec. 2, 2013, 7 pp.

Office Action, and translation thereof, from counterpart Korean Application No. 10-2013-7034978, dated Apr. 24, 2015, 6 pp.

First Office Action, and translation thereof, from counterpart Chinese Patent Application No. 201280036349.X, dated Dec. 17, 2015, 30 pp.

Response to Communication pursuant to Rules 70(2) and 70a(2) dated Dec. 18, 2014, from counterpart European Application No. 12792228.4, filed Jun. 25, 2015, 20 pp.

Extended Search Report from counterpart European Application No. 12792228.4, dated Dec. 1, 2014, 8 pp.

Office Action, and translation thereof, from counterpart Korean Patent Application No. 10-2013-7034978, dated Oct. 22, 2014, 9 pp.

Second Office Action, and translation thereof, from counterpart Chinese Patent Application No. 201280036349.X, dated Aug. 30, 2016, 32 pp.

Third Office Action, and translation thereof, from counterpart Chinese Application No. 201280036349.X, dated Jan. 24, 2017, 36 pp.

Decision of Rejection, from counterpart Chinese Application No. 201280036349.X, dated May 18, 2017, 11 pp.

Fourth Office Action, and translation thereof, from Chinese counterpart Application No. 201280036349.X, dated Nov. 15, 2017, 7 pp.

* cited by examiner

MUTING PARTICIPANTS IN A COMMUNICATION SESSION

CROSS REFERENCE TO RELATED APPLICATIONS

The present application claims priority under 35 U.S.C. 119(e) from U.S. Provisional Patent Application No. 61/491, 786, the entirety of which is incorporated herein by reference for all purposes.

TECHNICAL FIELD

The disclosure relates generally to video and/or teleconferencing.

BACKGROUND

Two or more users of computing devices may often engage in real-time communications, such as teleconferencing, where the users (also referred to as participants) exchange audio transmissions.

SUMMARY

One example provides a method that includes joining, by a first device, a communication session that includes second and third devices. The first device is configured to generate first audio data for the communication session and to output a first sound, the second device is configured to generate second audio data for the communication session and to output a second sound, and third device is configured to transmit third audio data for the communication session and to output a third sound. The method further includes receiving, by the first device, the second audio data generated by the second device. The method also includes receiving, by the first device, a mute command, wherein the mute command identifies the second device, and each of the first, second, and third devices are configured to receive mute commands. Upon receipt of the mute command, the method further includes causing, by the first device, a muting of the second audio data generated by the second device, such that the first and third devices output the first sound and the third sound, respectively, which do not include the second audio data generated by the second device.

Another example provides a method that includes receiving, from a first participant of a plurality of participants engaged in a communication session, at a first device through which the first participant engages in the communication session, a mute command. Each other participant of the plurality of participants is associated with one or more other devices via which the other participant is engaged in the communication session, the mute command identifies a second participant of the plurality of participants to be muted, and any participant of the plurality of participants may issue one or more mute commands at their respective device. The method further comprises responsive to receiving the mute command, causing the muting of the second participant for two or more participants engaged in the communication session, wherein the muting prevents audio data from the device of the second participant from being outputted by the other devices associated with the two or more participants engaged in the communication session.

A computer-readable storage medium comprising instructions for causing at least one processor to perform operations is also provided. The instructions include receiving, at a device, a mute command issued by a first participant of a plurality of participants in a communication session, wherein the mute command identifies a second participant to be muted and any participant of the plurality of participants may issue mute commands. The instructions further include responsive to receiving the mute command, muting the second participant for two or more participants engaged in the communication session, wherein the muting prevents an audio data from the second participant to be outputted by other devices associated with the two or more participants engaged in the communication session.

Another example includes a device including one or more processors. The device also includes a network interface to connect to a communication session having a plurality of participants and an output device that outputs audio data. The device further includes means for receiving a mute command issued by any participant of the plurality of participants, wherein the mute command identifies a participant to be muted, and wherein the muting prevents the output device from outputting an audio data from the participant to be muted.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

In accordance with common practice, the various described features are not drawn to scale and are drawn to emphasize features relevant to the present application. Like reference characters denote like elements throughout the figures and text.

DETAILED DESCRIPTION

During communication sessions between two or more participants, it may be desirable for one participant to remotely mute another. It may be desirable, for instance, to remotely mute a noisy participant for two or more, perhaps even all, participants in the communication session. Sometimes audio signals from one or more participants may be noisy (e.g., keyboard noise, static, animal sounds, etc.). Such noise may degrade the performance of the communication session. In some conferencing systems, only a moderator may be authorized and able to mute another participant for two or more participants in the communication session. Often, a moderator is preoccupied with other tasks and may fail to mute a noisy participant.

Authorizing more participants, in addition to or besides a moderator, to remotely mute participants may increase a response time for blocking noise, which may in turn improve the quality of a communication session over situations where only one participant can mute other participants. Giving muting capabilities to many, if not all, participants may allow participants less active than others (for example, a presenter or a moderator), may result in quick muting of noisy participants.

Techniques of the present disclosure are directed at functionality that enables each participant of a plurality of participants in a communication session to mute another participant for two or more of the participants. The communication session may be established between a plurality of devices and the communication session may support audio. Each participant may be authorized to mute other participants, not only for their own device, but for other devices associated with other participants. Each participant may also be authorized to un-mute muted participants. Indications may be provided to inform participants when a participant is muted or un-muted, as well as to identify which participant issued the muting or un-muting command. Social controls, utilized through transparency (e.g., providing identifying indications), may reduce the chance of misuse of the muting functionality.

An option to prevent a participant from being muted may appear on a display device of the participant's device. For example, a pop-up, butter-bar (e.g., a visually displayed line of text providing information) or other overlay may provide an option to cancel muting a participant within a selected time period. A muted participant may be able to cancel their mute at any time during the communication session. Sounds in the communication session, including speaking or unwanted noises, may be identified. Participants who are noisy may be detected and recommended for muting. In other examples, other indications and options are provided by aspects of this disclosure.

Figure 1:
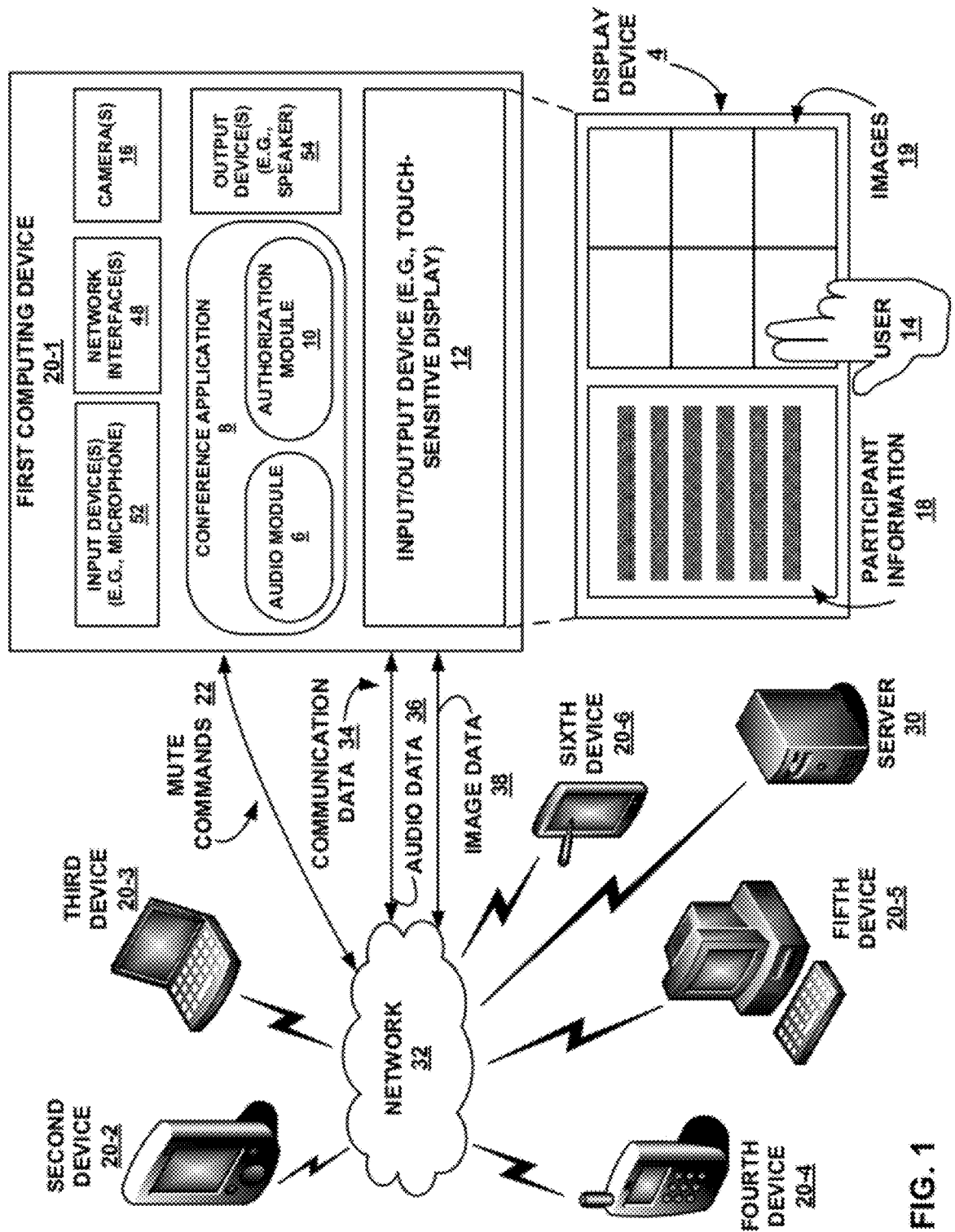
FIG. 1 is a block diagram illustrating an example of a computing device that may execute one or more applications and engage in a communication session with one or more other computing devices, in accordance with one or more aspects of the present disclosure.

FIG. 1 is a block diagram illustrating an example of a computing device 20-1 that may execute one or more applications (e.g., conference application 8) and engage in a communication session with one or more other devices 20-2 through 20-6, in accordance with one or more aspects of the present disclosure. In some examples, computing device 20-1 is not a computing device, but is any device capable of transmitting and receiving audio signals, such as an analog telephone. As described herein, first computing device 20-1 may simply be referred to as device 20-1 or computing device 20-1. Computing device 20-1 may issue or receive mute commands 22 identifying a participant to be muted for two or more participants in a communication session.

Computing device 20-1 may engage in a communication session with a plurality of other participants using other devices. A communication session may be any network-based communication between three or more participants. For example, a communication session may be a teleconference, a conference call, or a video conference. In one example, a communication session is a multi-party computer network-based teleconference. As described herein, a user 14 may be a participant in a communication session between computing device 20-1 and computing devices 20-2 through 20-6. User 14 may interact with computing device 20-1.

Computing device 20-1 may connect to any number of one or more other computing devices through network 32. As illustrated in FIG. 1, computing device 20-1 connects to five other computing devices, which may include second computing device 20-2, third computing device 20-3, fourth computing device 20-4, fifth computing device 20-5, and sixth computing device 20-6. In further examples, different numbers of computing devices 20-1 through 20-5 may be engaged in a communication session. For illustrative purposes, FIG. 1 is discussed in terms of a currently ongoing communication session that also supports video (e.g., a video conference) between computing device 20-1 and computing devices 20-2 through 20-6.

Computing device 20-1 may, in some examples, include, be, or be part of a portable computing device (e.g., a mobile phone, netbook, laptop, personal data assistant (PDA), tablet device, portable gaming device, portable media player, e-book reader, or a watch) as well as non-portable devices (e.g., a desktop computer). For purposes of illustration only, in this disclosure, computing device 20-1 is described as a portable or mobile device, but aspects of this disclosure should not be considered limited to such devices. Similarly, computing devices 20-2 through 20-6 may include or be part of a portable computing device as well as non-portable devices. As illustrated, second computing device 20-2 may be a PDA, third computing device 20-3 may be a laptop, fourth computing device 20-4 may be a mobile phone, fifth computing device 20-5 may be a desktop computer, and sixth computing device 20-6 may be a tablet device. In other examples, one or more of computing devices 20-1 through 20-6 engaged in the communication session may be a telephone or a conference phone. Any other numbers and combinations of types of computing devices participating in a video conference according to techniques of this disclosure are contemplated.

Computing device 20-1 may include an input/output device 12 (e.g., a touch-sensitive device), one or more input devices 52 (e.g., a microphone), one or more cameras 16, and one or more output devices 54 (e.g., a speaker). In some examples, input/output device 12 may only be an output device. For example, input/output device 12 may be a screen without input capabilities. In some examples, input/output device 12 may comprise display device 4. In other examples, display device 4 may be a presence-sensitive screen or a touch screen. In some examples, display device 4 may be capable of receiving touch input from a user 14 (e.g., display device 4 may comprise a touch screen, track pad, track point, or the like). User 14 may interact with input/output device 12, for example, by performing touch input on display device 4. One example of computing device 20-1 is more fully described in FIG. 2, discussed below.

Computing device 20-1 may connect to network 32, which may be a wired or wireless network, via one or more network interfaces 48. Computing device 20-1 may connect to computing devices 20-2 through 20-6, or to any other number of computing devices. Computing devices 20-2 through 20-6 may be connected to network 32 via wired and/or wireless links. Network 32 may include a wide-area network such as the Internet, a local-area network (LAN), an enterprise network, a wireless network, a cellular network, a telephony network, a Metropolitan area network (e.g., Wi-Fi, WAN, or WiMAX), one or more other types of networks, or a combination of two or more different types of networks (e.g., a combination of a cellular network and the Internet).

In another example, computing device 20-1 may connect to a server 30 through one or more network interfaces 48.

Computing device 20-1 and computing devices 20-2 through 20-6 may send data to or receive data from server 30 via network 32. Server 30 may be any of several different types of network devices. For instance, server 30 may be a conventional web server, a specialized media server, a personal computer operating in a peer-to-peer fashion, or another type of network device. In other examples, server 30 may provide communication sessioning capabilities in accordance with one aspect of this disclosure. For example, server 30 may manage a six-way teleconference or video conference between computing device 20-1 and computing devices 20-2 through 20-6.

Computing device 20-1 may be connected to any of the computing devices 20 in a peer-to-peer fashion, either directly or through network 32. A peer-to-peer connection may be a network connection that partitions tasks or workloads between peers (e.g., first computing device 20-1 and second computing device 20-2) without centralized coordination by a server (e.g., server 30). Computing device 20-1 and second computing device 20-2 may exchange communication data 34 via a peer-to-peer connection. In other examples, any combination of computing device 20-1 and computing devices 20-2 through 20-6 may communicate in a peer-to-peer fashion.

Although the systems and techniques described herein support many types of conferencing capabilities, for illustrative purposes only, FIG. 1 will be described in terms of a real-time video communication between computing devices 20-1 through 20-6. However, it is to be understood that the techniques and examples described in accordance with this disclosure apply to communications having any number of two or more participants. Also, for illustrative purposes only, this disclosure refers to participants in the sense that there is a single participant, or user, (e.g., a person) for each computing device 20-1 through 20-6. However, it is to be understood that there may be more than one participant for each of computing devices 20-1 through 20-6. In other examples, any of computing devices 20-1 through 20-6 may be engaged in a communication session without a user.

This disclosure also describes, for illustrative purposes only, each of computing devices 20-1 through 20-6 as transmitting a single audio or video feed. However, it is to be understood that there may be more than one audio or video feed from each of computing devices 20-1 through 20-6. For example, more than one user may be using a single computing device to participate in a communication session. For example, two participants may be using fourth computing device 20-4. In such an example, computing device 20-4 may include more than one input devices 52 (e.g., two microphones and two cameras). Regardless of the number of participants using each computing device, the techniques described in this disclosure may be applied to any additional audio or video feeds from a single computing device as if they were from separate computing devices.

In FIG. 1, computing devices 20-1 through 20-6 have established a real-time video and audio communication, referred to herein as a video conference or a communication session. User 14 may act as a participant in the communication session and operates first computing device 20-1. As referred to herein, user 14 may also be referred to as a participant. Similarly, as described herein for illustrative purposes only, five additional participants operate one of computing devices 20-2 through 20-6. As described above, in other examples, different numbers of participants and different numbers of computing devices may be engaged in the communication session.

Computing device 20-1 and computing devices 20-1 through 20-6 exchange communication data 34, which may be streamed real-time. In some examples, communication data 34 may include image data 38 and audio data 36. Image data 38 may be any data that can be visually represented on display device 4. Image data 38 may include one or more still images, a video, a document, a visual presentation, or the like. In one example, image data 38 may be one or more real-time video feeds. As described herein, image data 38 may comprise a plurality of image data signals. In some examples, one or more image data signals may be associated with a participant. In some examples, each computing device 20-2 through 20-6 communicatively coupled to computing device 20-1 provides an image data signal as part of image data 38.

In one example, audio data 36 may include audio feeds from the one or more participants. As described herein, audio data 36 may comprise a plurality of audio data signals. Each audio data signal may be sent from a single computing device. Likewise, each audio data signal may be associated with one or more participants. In some examples, each computing device 20-2 through 20-6 communicatively coupled to computing device 20-1 may provide an audio data signal as part of audio data 36. Likewise, computing device 20-1 may send one or more audio data signals to any of computing devices 20-2 through 20-6. An input device 52, such as a microphone, may generate an audio data signal. Computing device 20-1 may send the audio data signal to at least some of the other computer devices engaged in the communication session. Computing devices 20-2 through 20-6 may also comprise input devices, such as microphones, that may be used to generate audio data signals.

Audio data 36 may include one or more audio data signals that may include one or more sounds. Audio data 36 may include speech of a participant. For example, a participant may be talking in the communication session and using fifth computing device 20-5 to speak in proximity to a microphone of, or communicatively coupled to, fifth computing device 20-5. In other examples, audio data 36 may include music or other sounds.

Audio data 36 may also contain sounds that may degrade the performance or quality of the communication session. For example, such noises may be noises that are not intended to be included in the communication session. Audio module 6 may identify the sound as one or more of many types of sounds. Some types of sounds may include background noises, keyboard noises, coughing, traffic noise, or the like. Audio module 6 may provide a signal identifying the type of sound to conference application 8, which may in turn provide a signal to display device 4 to provide an indication identifying the type of sound. Audio module 6 may recommend muting a participant or a computing device based on the type of sounds the participant or computing device is distributing in the communication session.

Display device 4 may display participant information 18. The participant information 18 may include identifying information for each participant or computing device 20-2 through 20-6 engaging in the communication session. Identifying information may include a name or username of the participant, a location of the participant, a volume indicator for the sounds being sent by the participant, an indication of the type of sound the participant is sending, an indication that a participant is currently speaking, an indication that a participant is sending undesired noise, or other information relevant to a communication session. Indications may take any form, including highlighting a participant, displaying text, an overlay, a butter-bar, etc.

Display device 4 may also display images 19 for some or all of the participants in the communication session. Images 19 may include some or all of image data 38 that computing device 20-1 receives in the communication session. In other examples, participant information 18 and images 19 may be merged or overlap. Participant information 18 and images 19 may be displayed as in any conferencing application used by computing devices.

In some examples, image data 38 and audio data 36 may be transferred between first computing device 20-1 and computing devices 20-2 through 20-6 over different channels. In other examples, image data 38 and audio data 36 may be transferred over a single channel. Communication data 34 may be transferred using a Real-time Transport Protocol ("RTP") standard developed by the Internet Engineering Task Force ("IETF"). In examples using RTP, image data 38 may have a format such as H.263 or H.264. In other examples, other protocols or formats are used. In other examples, some or all of communication data 34 may be transferred encrypted, such as, for example, using Secure Real-time Transport Protocol (SRTP), or any other encrypted transfer protocol.

In one example, computing device 20-1 may generate a portion of audio data 36 from input device 52 (e.g., a microphone) and a portion of image data 38 from camera 16. Computing device 20-1 may receive audio data from microphone 52. User 14 may be speaking into a microphone input device 52 in order to send or otherwise transmit speech to other computing devices 20-2 through 20-6. In other examples, user 14 may be providing other sounds for pickup by microphone input device 52. Additionally, unwanted sounds may be picked up by microphone input device 52 and output in the communication session.

During a video conference, one or more cameras 16 and one or more other input devices 52 of first computing device 20-1 may be activated. Computing device 20-1 may receive video data from camera 16. In one example, image data output from camera 16 is provided to one or more of computing devices 20-2 through 20-6, in order that image data associated with user 14 may be displayed on one or more of computing devices 20-2 through 20-6.

Image data associated with user 14 may include any image data user 14 wishes to display during the video conference. For example, camera 16 may be pointed approximately at user 14 in order that other participants in the video conference may see an image of user 14. In another example, camera 16 may be pointed at another object of interest in order to transmit a video or image of the object. In some examples, computing device 20-1 may switch between different cameras 16, such as a front-facing camera and a rear-facing camera. In other examples, user 14 may direct camera 16 elsewhere, for example, at a scene or a document.

Input device 52, such as a microphone, may record and sound incident to the microphone, such as a voice of user 14. Computing device 20-1 may, in real-time, send this video data from camera 16 and audio data from input device 52 to one or more of the computing devices 20-2 through 20-6. In other examples, image data 38 may be sourced from a variety of inputs besides camera 16, such as, for example, a slideshow of pictures, a pre-recorded video feed, a screencast showing a window, or the like. Similarly, audio data 36 may be sourced from any audio source, for example, a sound file stored on one of computing devices 20-1 through 20-6.

Likewise, one or more of the computing devices 20-2 through 20-6 sends image data 38 and audio data 36, from input devices similar to input devices 52, to computing device 20-1. During a communication session, computing device 20-1 may output some or all of this received audio data 36 and image data 38, for example, with output devices 54 (e.g., a speaker) and display device 4. Multiple audio data signals may be streamed by computing device 20-1. In further examples, audio data 36 may not be streamed while image data 38 is streamed.

Display device 4 of computing device 20-1 may display all or part of image data 38 as images 19. Conference application 8 may define a number of image data signals that may be displayed on display device 4 at any given moment during a communication session. As used herein, for illustrative purposes, "displaying a participant" may mean displaying image data associated with that participant or with the computing device the participant is using. For example, as shown in FIG. 1, display device 4 may be configured to display image data associated with each of the six participants in the communication session in images 19.

In one example, image signals and audio signals from a given computing device 20-1 through 20-6 may be associated with each other (e.g., a portion of audio data 36 is diegetic to a portion of image data 38). In other examples, image signals and audio signals may not be associated with each other (e.g., an audio signal is non-diegetic with an image signal, for example, a sound track is played along with a video).

In some examples, communication data 34 may include both audio data 36 and image data 38; however, in other examples, communication data 34 may include only one of either audio data 36 or image data 38 for a computing device 20-1 through 20-6. Further, at any given moment during the real-time communication, any of computing devices 20-1 through 20-6 may be sending only audio data 36, only image data 38, or both.

Computing device 20-1 includes a conference application 8 that, when executed, provides functionality to computing device 20-1 to establish and maintain communications between one or more computing devices 20-1 through 20-6. Conference application 8 may also provide signals to display device 4 to display information related to the communication session communications and to enable user 14 to interact with conference application 8.

Conference application 8 may include an audio module 6. Audio module 6, in various instances, provides computing device 20-1 with capabilities to mute a participant for another participant. For example, user 14 may determine that audio data from another participant, for example, a participant using fourth computing device 20-4, is contributing unwanted sounds to the communication session. User 14 may determine this from an indication included in participant information 18 that identifies fourth computing device 20-4 as sending audio data with unwanted sounds. In other examples, user 14 may determine fourth computing device 20-4 is the source of the unwanted sounds in other ways, for example, by being familiar with the voice of the participant using fourth computing device 20-4, or by asking the participants who is making the noise.

Audio module 6 may provide user 14 with an ability to mute another computing device 20-2 through 20-6 during a communication session. In the example where audio signals from fourth computing device 20-4 include unwanted sounds, user 14 may elect to mute fourth computing device 20-4. When computing device 20-4 is remotely muted at computing device 20-1, computing device 20-1 may issue one or more mute commands 22 identifying computing device 20-4 to be muted. A mute command 22 is a signal that instructs one or more computing devices 20-1 through 20-6, server 30, or other device to mute an identified computing device. In some instances, mute commands 22 may instruct the identified computing device to mute itself.

A mute command 22 may also identify which computing devices 20-1 through 20-6 will not output audio signals from the computing device identified to be muted by the mute command 22. For example, only certain participants in the communication session may mute the identified computing device. Such a situation may be, for example, when a subset of the participants in the communication session wants to discuss confidential matters amongst themselves and not allow other participants to hear. This may be useful to create multiple conversations between subsets of participants without ending the communication session. In other situations, the one or more mute commands 22 mute the identified computing device for all computing devices in the communication session.

Muting a noisy computing device, for example fourth computing device 20-4, for one or more other participants in the communication session may improve the quality of the communication session. Furthermore, participants may experience a more enjoyable and less noisy communication session when unwanted sounds are removed from the communication session.

Audio module 6 may also provide user 14 with the ability to mute computing device 20-1. Muting computing device 20-1 may prevent audio signals being sent to the other computing devices 20-2 through 20-6. In another example, computing device 20-1 may be muted only for a subset of the computing devices 20-2 through 20-6. For example, computing device 20-1 may be muted for computing devices 20-3 and 20-4, but not for computing devices 20-2, 20-5, and 20-6. That is, audio signals may be sent from computing device 20-1 to computing devices 20-2, 20-5, and 20-6 but not to computing devices 20-3 and 20-4.

Conference application 8 may include an authorization module 10. Authorization module 10 may authorize computing device 20-1 to perform moderating functions in a communication session. For example, authorization module 10 may authorize computing device 20-1 to add additional participants to an already established communication session. Furthermore, authorization module 10 may authorize computing device 20-1 to remove a participant from a communication session. Computing device 20-1 may utilize these functions through additional signals. In other examples, conference application 8 contains further communication modules having additional capabilities.

Authorization module 10 may also authorize computing device 20-1 to issue mute commands 22. In some examples, audio module 6 provides remote muting functionality to computing device 20-1. In other examples, authorization module 10 provides remote muting functionality to computing device 20-1.

In some examples, every computing device 20-1 through 20-6 may be authorized to issue mute commands 22. Every computing device 20-1 through 20-6 may also be authorized to allow another participant to join the communication session or to remove a participant from the communication session. Social controls, for example, utilized through transparency (e.g., providing indications identifying which participant is issuing commands), may reduce the chance of misuse of the muting functionality.

Figure 2:
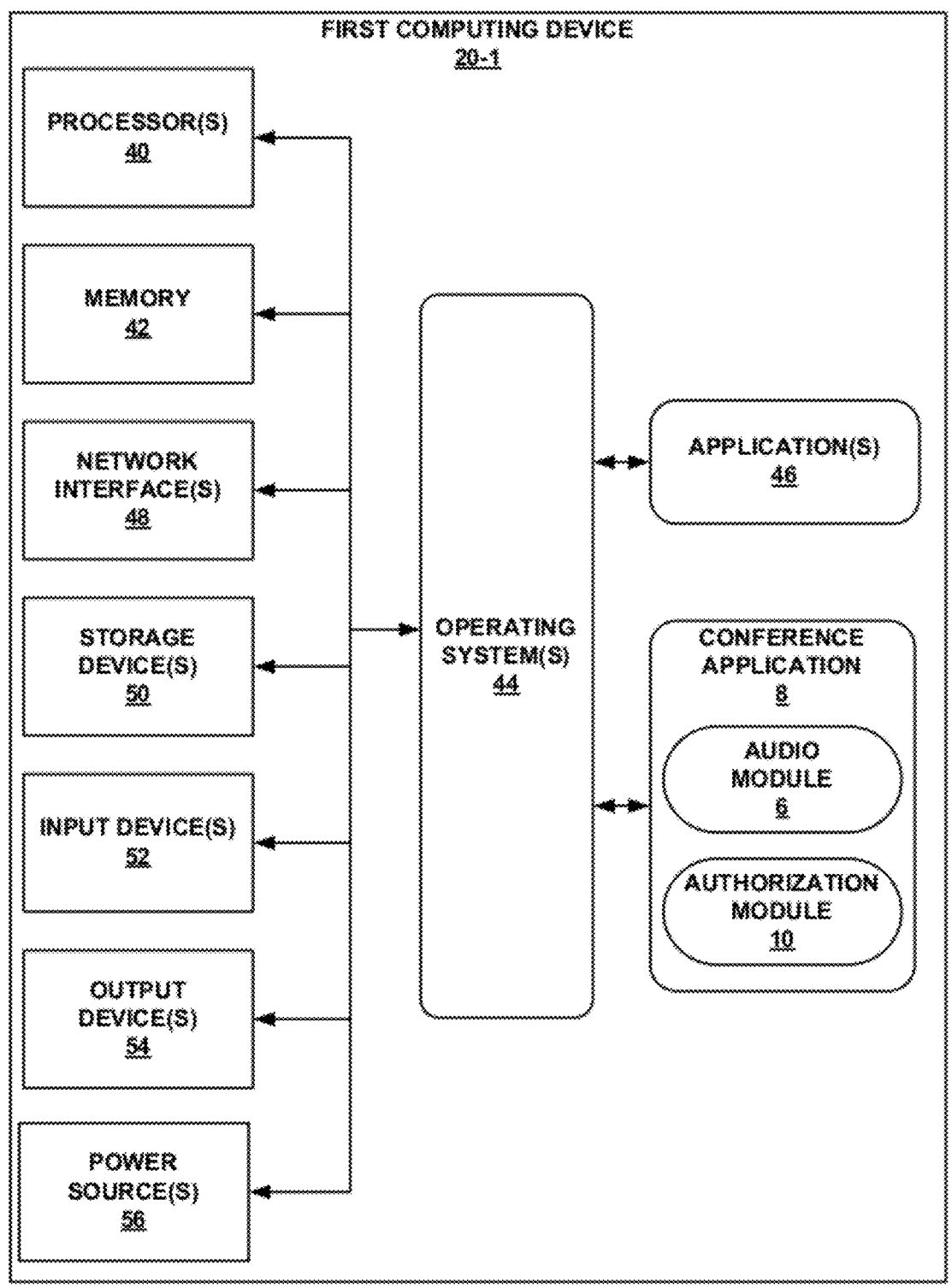
FIG. 2 is a block diagram illustrating further details of one example of computing device shown in FIG. 1, in accordance with one or more aspects of the present disclosure.

FIG. 2 is a block diagram illustrating further details of one example of computing device 20-1 shown in FIG. 1. FIG. 2 illustrates only one particular example of computing device 20-1, and many other example embodiments of computing device 20-1 may be used in other instances. Additionally, one or more computing devices 20-2 through 20-6 may be similar to computing device 20-1 as shown in FIG. 2.

As shown in the specific example of FIG. 2, computing device 20-1 includes one or more processors 40, memory 42, one or more network interfaces 48, one or more storage devices 50, one or more input devices 52, one or more output devices 54, and one or more power sources 56. Computing device 20-1 also includes one or more operating systems 44. Computing device 20-1 may include one or more applications 46 and conference application 8. Conference application 8 may include mute module 6 and authorization module 10, which may be executable by computing device 20-1. In other examples, one or more operating systems 44 may include conference application 8, mute module 6, or authorization module 10, which may be executable by computing device 20-1. Operating system 44, applications 46 and conference application 8 are also executable by computing device 20-1. Each of components 40, 42, 44, 46, 48, 50, 52, 54, 56, 6, 8, and 10 may be interconnected (physically, communicatively, and/or operatively) for inter-component communications.

Processors 40 may be configured to implement functionality and/or process instructions for execution in computing device 20-1. Processors 40 may be capable of processing instructions stored in memory 42 or instructions stored on storage devices 50.

Memory 42 may be configured to store information within computing device 20-1 during operation. Memory 42 may, in some examples, be described as a non-transitory or tangible computer-readable storage medium. In some examples, memory 42 is a temporary memory, meaning that a primary purpose of memory 42 is not long-term storage. Memory 42 may also, in some examples, be described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 may be used to store program instructions for execution by at least one processors 40. Memory 42 may be used by software or applications running on computing device 20-1 (e.g., one or more of applications 46) to temporarily store information during program execution.

Storage devices 50 may also include one or more non-transitory or tangible computer-readable storage media. Storage devices 50 may be configured for long-term storage of information. In some examples, storage devices 50 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 20-1 also includes one or more network interfaces 48. Computing device 20-1 may utilize one or more network interfaces 48 to communicate with external devices via one or more networks (e.g., network 32 shown in FIG. 1). In one example, one or more network interfaces 48 may correspond to an interface for receiving data from computing devices (e.g., computing devices 20-2 through 20-6 of FIG. 1). In some examples, computing device 20-1 may include a plurality of either or both input and output interfaces. In some examples, network interfaces 48 may include separate input and output network interfaces of network interfaces 48. In other examples, input and output interfaces may be may be functionally integrated.

One or more network interfaces 48 may include one or more of a network interface card, such as an Ethernet card, configured to communication over, for example, Ethernet, transmission control protocol (TCP), Internet protocol (IP), asynchronous transfer mode (ATM), or other network communication protocols. In other examples, one of network interfaces 48 may be an optical transceiver, a radio frequency transceiver, or any other type of device that can send and receive information. Examples of such network interfaces may include Bluetooth®, 3G and WiFi® radios in mobile computing devices as well as USB. Examples of such wireless networks may include WiFi®, Bluetooth®, and 3G. In some examples, computing device 20-1 may utilize network interface 48 to wirelessly communicate with an external device, such as server 30, one or more computing devices 20-2 through 20-6, or other networked computing device.

Computing device 20-1 may also include one or more input devices 52. Input devices 52 may be configured to receive input, for example, from user 14, through tactile, audio, or video input. Examples of input devices 52 may include a touch-sensitive display, a mouse, a keyboard, a voice responsive system, a microphone, camera 16, or any other type of device for detecting a command or input from user 14. In one example, one or more input devices 52 may comprise input/output device 12 as shown in FIG. 1. In another example, one or more input devices 52 may comprise display device 4 as shown in FIG. 1.

One or more output devices 54 may also be included in computing device 20-1, e.g., a speaker. Output devices 54 may be configured to provide output to user 14 using tactile, audio, or video output. Output devices 54 may utilize a sound card, a video graphics adapter card, or any other type of device for converting a signal into an appropriate form understandable to humans or machines. Additional examples of output devices 54 may include a cathode ray tube (CRT) monitor, a liquid crystal display (LCD), or any other type of device that can provide output to user 14. In one example, one or more output devices 54 may comprise input/output device 12 as shown in FIG. 1. In another example, one or more output devices 54 may comprise display device 4 as shown in FIG. 1.

Computing device 20-1 may include one or more power sources 56, which may be rechargeable and provide power to computing device 20-1. The one or more power sources 56 may be one or more batteries. The one or more batteries may be made from nickel-cadmium, lithium-ion, or any other suitable material. In another example, the one or more power sources 56 may include a power supply connection that receives power from a power source external to computing device 20-1.

Computing device 20-1 may include one or more operating systems 44. One or more operating systems 44 may control the operation of components of computing device 20-1. For example, operating systems 44 may facilitate the interaction of application 46 or video conference application 8 with processors 40, memory 42, network interfaces 48, storage devices 50, input devices 52, output devices 54, and one or more power sources 56. In other examples, conference application 8 may be managed at least partially by one or more operating systems 44.

Conference application 8 may include mute module 6 and authorization module 10, which may be executed as part of one or more operating systems 44. In other cases, mute module 6 and authorization module 10 may be implemented or executed by computing device 20-1. Mute module 6 may process audio signals, e.g., audio data 36 received from one or more of computing devices 20-2 through 20-6 as well as audio data 36 sent by computing device 20-1. Mute module 6 may send mute commands 22 to external devices communicatively coupled to computing device 20-1, such as computing devices 20-2 through 20-6 or server 30. Mute module 6 may mute remote participants in a communication session for one or more other participants in the communication session.

Mute module 6 or conference application 8 provides a mute command or other signal related to the mute command to instruct one or more computing devices 20-1 through 20-6 to mute one of the computing devices in the communication session. Additionally, mute module 6 may receive input from a component such as processors 40, memory 42, one or more network interfaces 48, one or more storage devices 50, one or more output devices 54, one or more power sources 56, or one or more operating systems 44. In some cases, mute module 6 may perform additional processing on communication data 34. In other cases, mute module 6 may transmit input or signals to an application, e.g. applications 46, or other component in computing device 20-1.

Any applications, e.g. applications 46 or conference application 8, implemented within or executed by computing device 20-1 may be implemented or contained within, operable by, executed by, and/or be operatively/communicatively coupled to components of computing device 20-1, e.g., one or more processors 40, memory 42, one or more network interfaces 48, and/or storage devices 50.

Figure 3:
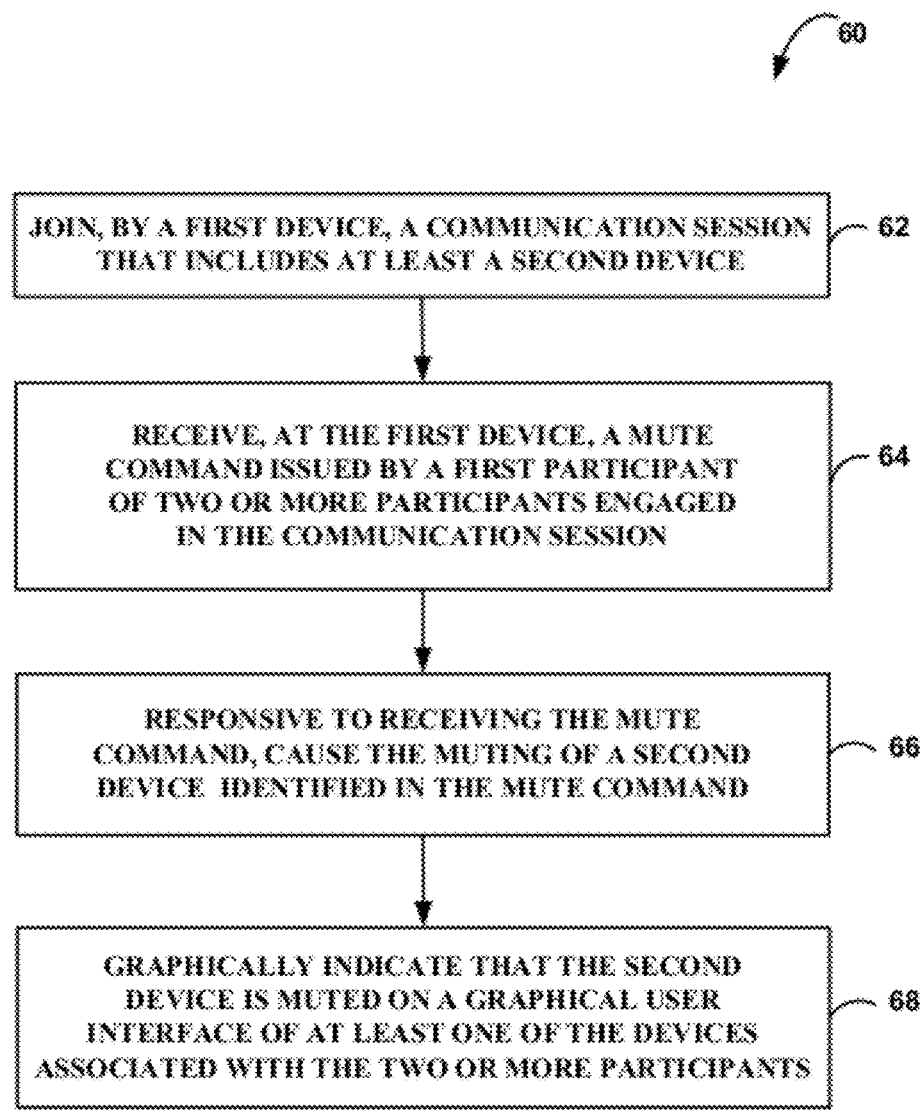
FIG. 3 is a flow chart illustrating an example method that may be performed by a computing device for any participant of a plurality of participants in a communication session to mute another participant, in accordance with one or more aspects of the present disclosure.

FIG. 3 is a flow chart illustrating an example method that may be performed by a computing device for any participant of a plurality of participants in a communication session to mute another participant for two or more of the participants, in accordance with one or more aspects of the present disclosure. In some non-limiting examples, method 60 may be performed by any of devices 20-1 through 20-6 as shown in FIG. 1 or 2.

Method 60 may include joining, by a first device, a communication session that includes at least a second device (62). Method 60 may further include receiving, at a device, a mute command issued by a first participant of a plurality of participants engaged in the communication session (64). The mute command identifies a second participant to be muted. Furthermore, any participant of the plurality of participants may issue mute commands. The device receiving the mute command may be the device used to issue the mute command or may be another device.

For example, devices 20-1 through 20-6 may be engaged in a communication session, wherein audio data 36 is exchanged between some or all of devices 20-1 through 20-6. For purposes of illustrating method 60 and various related examples, an example situation is described wherein six unique participants are each associated with one of device 20-1 through 20-6. In this illustrative example, user 14 using device 20-1 is the first participant that issues a mute command that identifies a second participant, that using device 20-2 to be muted. However, it is to be understood that a single participant may be associated with more than one device 20-1 through 20-6. Similarly, a single device 20-1 through 20-6 may be associated with more than one participant.

Responsive to receiving the mute command, method 60 further includes causing the muting of the second participant for two or more participants engaged in the communication session (66). Muting prevents devices associated with the two or more participants engaged in the communication session from outputting audio data from the second participant. For example, device 20-2 may be muted for all participants in the communication session, which is, devices 20-1 through 20-6. In other examples, device 20-2 may be muted only for a subset of participants using devices 20-1 through 20-6. For example, if device 20-2 was muted only for participants using devices 20-3 and 20-4, then participants using devices 20-1, 20-5, and 20-6 would be able to hear audio signals from device 20-2 while participants using computing devices 20-3 and 20-4 would not.

A muting function may be performed in different ways. How muting is performed may depend on how devices 20-1 through 20-6 are communicatively connected. If one or more of devices 20-1 through 20-6 are communicatively coupled to a server, such as server 30, the server may process the mute commands. If devices 20-1 through 20-6 are communicatively coupled together without a server, either the muted computing device or the computing devices that are going to cease outputting audio signals from the muted computing device may process the mute commands.

How muting is performed may also depend on where the audio signals to be muted are blocked. For example, a mute command issued to mute second device 20-2 may prevent audio signals at second device 20-2 (for example, received by a microphone that is coupled to or included in second device 20-2) from being sent by second device 20-2. That is, the muted second device 20-2 processes the mute command. In such an example, the audio signals are blocked at their source.

Alternatively, a mute command issued to mute second device 20-2 may prevent other devices from outputting audio signals received from second device 20-2. For example, third device 20-3 may receive an audio signal sent from second device 20-2. However, upon receiving the mute command identifying second device 20-2, third device 20-3 ceases outputting the audio signal from second device 20-2. That is, third device 20-3 processes the mute command and does not output audio signals received from second device 20-2. Third device 20-3 may continue to receive an audio signal from second device 20-2 while second device 20-2 is muted.

In an example where one or more of devices 20-1 through 20-6 are communicatively coupled to server 30, server 30 may process mute commands. Server 30 may receive audio signals from the muted second device 20-2. Server 30 may not forward the audio signals to any device intended to not output the audio signals from second device 20-2. The mute command may identify which participants, or their computing devices, are to not output the audio signals from second device 20-2. In another example, server 30 may pass on the audio signals from second device 20-2 to the devices meant to mute second device 20-2, but also send command signals to the devices so they may locally mute second device 20-2.

As used herein, in some examples, muting functions may be initialized using a mute command but actually performed using signals related to the mute command, such as a secondary mute command or other command signal. For example, secondary mute commands may be issued by a server, such as server 30, to each device 20-1 through 20-6 that was instructed to mute a participant. A secondary mute command may be any command signal based on a mute command and received at a device.

Method 60 may further comprise receiving an un-mute command identifying a muted participant or computing device to be un-muted. An un-mute command may be a command signal used to cancel a previous muting a participant, for example, previously muted second device 20-2. In one example, any participant of the plurality of participants in the communication session may issue un-mute commands. For example, a participant may issue an un-mute command to un-mute their computing device. In another example, a subset of the plurality of participants may issue un-mute commands. In yet another example, only those participants authorized to issue mute commands may issue un-mute commands. An authorization module, such as authorization module 10, may be used to determine whether a participant is authorized to issue mute or un-mute commands. Un-mute commands may be processed in any of the ways a mute command may be processed.

At any time during the communication session, if a device receives an un-mute command identifying a muted computing device, the muted device is un-muted for the receiving device. For example, if second device 20-2 is muted for third device 20-3, third device 20-3 begins to output the audio signal from second device 20-2 when third device 20-3 receives the un-mute command or a signal related to the un-mute command.

In some examples, one or more access control lists of participants may be determined. The access control lists may define which participants may issue certain commands. For example, a mute access control list may be generated that authorizes participants or computing devices on the list to issue mute commands. A participant or computing device not on the mute access control list may not be able to issue a mute command. As another example, an un-mute access control list may be generated that authorizes participants or computing devices on the list to issue un-mute commands. An initiator or leader of the communication session may designate which participants are added to a mute or un-mute access control list. In other examples, other methods of generating access control lists are used, such as participants placing themselves on an access control list.

In some examples, muting a computing device or participant may occur automatically. In some examples, a participant who joins a conference may be automatically placed into a muted state. In such an example, conference policy may dictate muting newly added participants. A newly added and muted participant may have to issue an un-mute command to un-mute their computing device.

Method 60 may indicate that a participant or device is muted when the participant or device is muted for two or more participants engaged in the communication session. An indication may be provided to each participant in the communication session, or only to a subset of participants. Instructions to provide the indication may be included with the mute command or may be signaled separately. Furthermore, instructions to provide the indication may be processed in any of the ways a mute command may be processed.

The indication may be any output that informs a participant that a participant is muted. For example, the indication may be an auditory indication outputted by a speaker that may indicate a participant has been muted. The indication may also include which participant was muted. For computing devices that include a display device that displays information related to the communication session, the indication may be a visual indication.

For example, as shown in FIG. 1, computing device 20-1 may display image data 19 and participant information 18. Participant information 18 may provide an indication that the second computing device 20-2 is muted. In some examples, an indication may be a graphical indication displayed on a graphical user interface (GUI) of a computing device. In other examples, other means of indicating when a participant or a computing device is muted are used, such as auditory indications outputted by a speaker of at least one computing device.

Method 60 may also include graphically indicating that the second device is muted on a graphical user interface of at least one of the devices associated with the two or more participants (68). Other indications may also be provided. For example, participant information 18 may include a graphical volume indicator for each participant. That is, a volume indicator may be displayed (e.g., graphically displayed) for each participant that describes a volume level for each participant's audio signals in the communication session. Similarly, method 60 may provide an indication of the identity of the participant who issued the mute command for the muted participant. For example, responsive to the first participant muting the second participant for two or more participants engaged in the communication session, method 60 may indicate that the first participant muted the second participant. This indication may be provided or processed in any of the ways discussed above with respect to an indication identifying the muted participant. Furthermore, the graphical volume indicator may indicate whether the audio data corresponds to normal or desired audio, such as speech, or undesirable, noisy audio.

Identifying the participant who issued a mute command may be helpful to mediate the communication session. Social constraints, imposed internally or through the actions of the communication session participants, may be used to regulate the use of the mute (and un-mute) functionality. Any participant may be tempted to misuse the mute functionality at times. By identifying which participant is issuing mute commands, the participant may not have as much immunity as the participant might in a communication session with anonymous muting.

Method 60 may further include identifying at least one sound in the audio data or signal. Identifying a sound in an audio data or signal may include categorizing the sound as one of a plurality of sound types. For example, different sound types may include, but are not limited to, speaking, music, keyboard noise, animal sounds such as dog barking, people speaking in the background, traffic sounds, wind, static, other unwanted noises, or background noises. A sound or audio signal may receive more than one category of sounds. Sounds may be identified by comparing them to sound profiles of different types of sounds. The presence of similar characteristics of a sound to a sound profile, or otherwise approximately matching the profile, may indicate the sound is of that type of the sound profile. Other ways of detecting sound types may also be used.

An indication of a type of sound may be provided to one or more participants. For example, the type of sounds in an audio signal from a participant may be included in participant information 18 associated with the participant. Also, an indication of a quality of the audio signal may be provided.

A message recommending to mute the second participant may be additionally based on a current volume level of the audio data, a historical volume level, a noise status of the audio data, content of the audio data, or timing of the audio data. For example, if a current volume level of the audio data is above a first threshold volume level or below a second threshold volume level, the computing device or participant associated with the audio data may be recommended to be muted. In some examples, a recommendation to be muted is not issued, but instead the computing device or participant associated with the audio data is automatically muted.

In another example, a volume level may be determined and recorded throughout a portion of a communication session, and when the historical level is above a first threshold volume level or below a second threshold volume level, the computing device or participant associated with the audio data may be recommended to be muted. The historical level may be an averaged volume level. For example, a loud noise may be detected, and after the noise has persisted for a select period of time, this historical noise level may result in the computing device or participant associated with the audio data to be muted. In another example, if abusive or disrupted speech is detected in an audio data (using, for example, voice recognition software), the computing device or participant associated with the audio data may be recommended to be muted.

Method 60 may further include providing, at a computing device associated with at least one of the plurality of participants, a message recommending to mute a participant based on a sound type of at least one sound in an audio signal from the participant. The message may have an auditory, visual, or tactile form. For example, the message may be displayed as a pop-up message outputted, for example, by display device 4. The message may also be a butter-bar message, which is an overlay that typically contains one or a few lines of text. The butter-bar may contain scrolling text. The message may also be associated with the participant in the participation information 18.

A muted computing device may also output a message that indicates that the muted participant is muted for two or more participants engaged in the communication session. For example, if second computing device 20-2 is muted for computing devices 20-3 and 20-4, a visual message may be displayed that indications the participant's microphone is muted for third and fourth computing devices 20-3 and 20-4. Versions of such a visual message may be displayed on any computing device in the communication session.

A message indicating that a mute command has been issued to mute a participant for the two or more participants may also be outputted by one or more computing devices 20-1 through 20-6. In one example, each computing device 20-1 through 20-6 engaged in the communication session outputs a version of the message. This message may be displayed before, as, or after the participant is actually muted.

Similar messages may be outputted for un-mute commands. Other types of commands, such as add or remove commands may be outputted for one or more computing devices 20-1 through 20-6. Messages may be displayed via an overlay on a display device of computing devices 20-1 through 20-6. The overlay may include information related to the communication session.

Before a participant identified in a mute command is muted, the participant may have an option to cancel the mute command. Reasons a participant may want to cancel a muting may include if the participant believes the mute command is erroneous, if an unwanted noise associated with the participant has ceased, if the participant does not want to be muted, or for any other reason. Before the participant is muted, a message may be provided to the participant that a mute command has been issued to mute the participant. The participant may have a selected time period, for example, ten seconds, in which to cancel the mute command before the participant is muted. Other time periods may be used, for example, up to a minute. Upon receiving a cancel command from the participant (for example, the participant hits a key or touch-target selecting an option to cancel), method 60 may cancel the muting of the participant.

In one example, once a participant's muting has been canceled, a new mute command to mute the participant may be made at any future time in the communication session. If a participant is already muted, a mute command issued to mute the participant again for the same participants may not affect the muted participant. In another example, a mute command may un-mute a currently muted participant. If a participant is muted for a second participant but not a third, a mute command identifying the participant to be muted for the third participant may mute the participant for the third participant.

A mute command may be issued in a number of ways. For example, a mute command identifying a second participant to be muted may be issued by a first participant interacting with an image associated with the second participant. For example, if the communication session is a video conference, as in FIG. 1, user 14 may issue a mute command by interacting with information associated with the participant user 14 wishes to mute. If display device 4 is a touch-sensitive screen, user 14 may tap on the image associated with the user in images 19 or in participant information 18 to mute a participant. If display device 4 is not a touch-sensitive screen, user 14 may interact with the image associated with the participant in images 19 or in participant information 18 in other ways, for example, with one or more input devices 52, such as a mouse or keyboard.

In other examples, a participant may issue an add command to allow someone (such as another computing device or participant) to join an already engaged communication session. Similarly, a participant may issue a remove command that identifies a participant in the communication session to be removed from the communication session. Upon receiving a remove command, the participant may be booted from the communication session. Any of the above described methods or processes associated with a mute or un-mute command may be similarly applied to an add or remove command.

Figure 4:
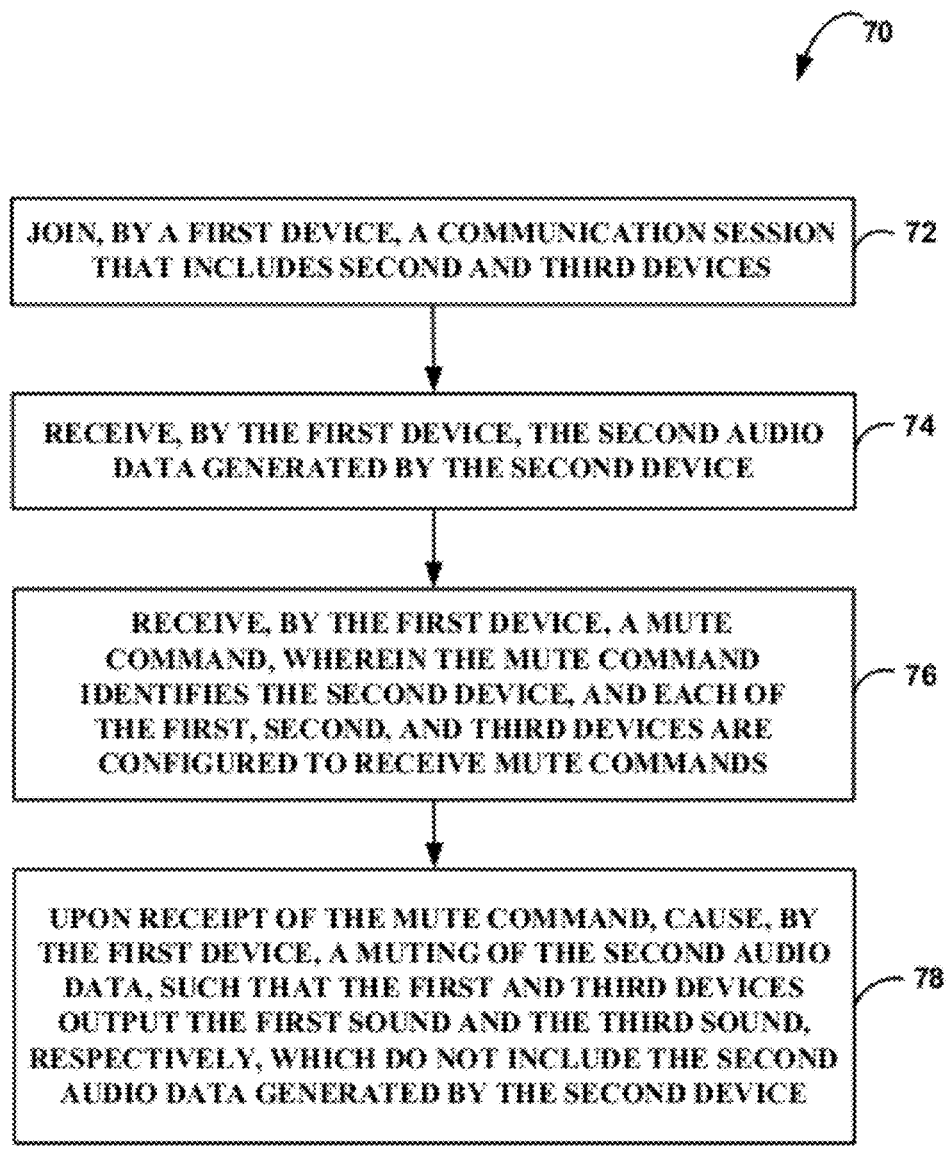
FIG. 4 is a flow chart illustrating another example method that may be performed by a device in a communication session to mute another device in the communication session, in accordance with one or more aspects of the present disclosure.

FIG. 4 is a flow chart illustrating another example method 70 that may be performed by a device in a communication session to mute another device in the communication session, in accordance with one or more aspects of the present disclosure. Method 70 includes joining, by a first device, a communication session that includes second and third devices (72). The first device is configured to generate first audio data for the communication session and to output a first sound, the second device is configured to generate second audio data for the communication session and to output a second sound, and the third device is configured to transmit third audio data for the communication session and to output a third sound. Method 70 further includes receiving, by the first device, the second audio data generated by the second device (74). Method 70 also includes receiving, by the first device, a mute command, wherein the mute command identifies the second device, and each of the first, second, and third devices are configured to receive mute commands (76). Upon receipt of the mute command, causing, by the first device, a muting of the second audio data generated by the second device, such that the first and third devices output the first sound and the third sound, respectively, which do not include the second audio data generated by the second device (78).

Figure 5:
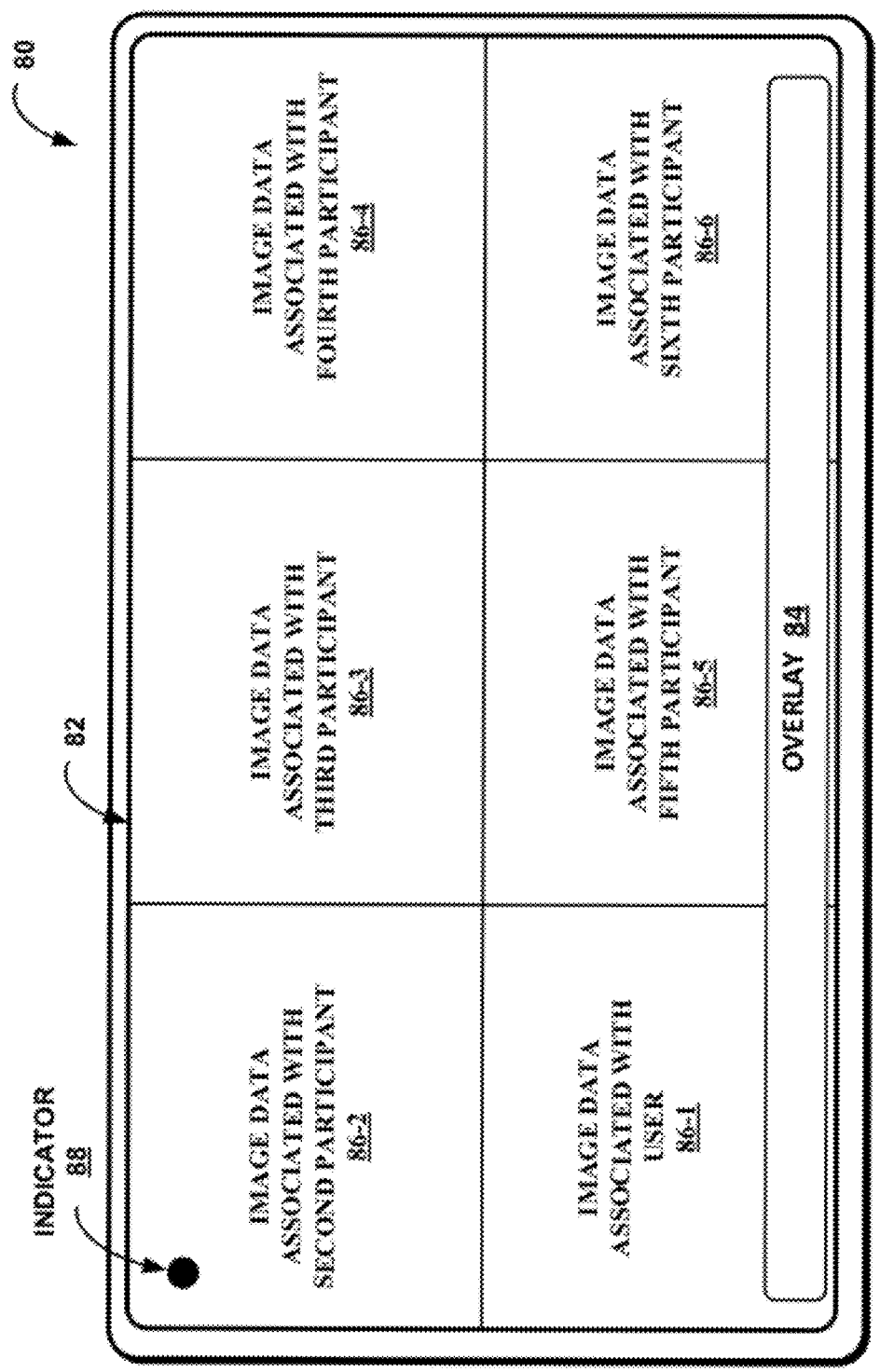
FIG. 5 is a block diagram illustrating one example of a computing device configured to display messages associated with a communication session between a plurality of participants, in accordance with one or more aspects of the present disclosure.

FIG. 5 is a block diagram illustrating one example of a computing device 80 configured to display messages associated with a communication session between a plurality of participants, in accordance with one or more aspects of the present disclosure. FIG. 5 illustrates only one particular example of computing device 80, and many other example embodiments of computing device 80 may be used in other instances. Additionally, computing device 80 may be similar to computing device 20-1 as shown in FIGS. 1 and 2. Furthermore, one or more devices 20-2 through 20-6 may be similar to computing device 80 as shown in FIG. 5.

Computing device 80 comprises a display device 82, which may be similar to display device 4 of FIG. 1. For illustrative purposes, FIG. 5 is described in terms of a communication session that computing device 80 is currently engaged in with five other computing devices, such as devices 20-2 through 20-6 of FIG. 1. A user, such as user 14 of FIG. 1, is using computing device 80.

As shown, display device 82 is displaying image data associated with each of the six participants in the communication session. Image data associated with the user 86-1 is provided in addition to image data associated with the second participant 86-2, image data associated with the third participant 86-3, image data associated with the fourth participant 86-4, image data associated with the fifth participant 86-5, and image data associated with the sixth participant 86-6. Computing device 80 may display image data in a video conference in any manner.

Display device 82 may also display an overlay 84 that displays messages or other information related to the communication session. For example, overlay 84 may provide indications including when a participant is muted, which participants the muted participant is muted for, who issued a mute command, who issued an un-mute command, etc. Overlay 84 may be in the form of a butter-bar. Overlay 84 may have any shape, coloration, orientation, or position on display device 82.

An indicator 88 may be displayed by display device 82. An indicator may be any displayed marking or other image that provides information related to the communication session. Indicators may be associated with a participant or computing device engaged in the communication session. For example, indicator 88 may be an icon that is displayed when a participant is muted and not displayed when the participant is not muted. As shown in FIG. 5, indicator 88 is shown over image data associated with second participant 86-2, indicating that the second participant is muted. In other examples, other forms of indicators may be used.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. Aspects or features of examples described herein may be combined with any other aspect or feature described in another example. These and other embodiments are within the scope of the following claims.

The invention claimed is:

1. A method comprising:
joining, by a first device, a communication session that includes second and third devices, wherein:
the first device is configured to generate first audio data for the communication session and to output a first sound,
the second device is configured to generate second audio data for the communication session and to output a second sound, and
the third device is configured to generate third audio data for the communication session and to output a third sound;
receiving, by the first device, the second audio data generated by the second device;
identifying, by an audio module of the first device, at least one sound included in audio data from the second device as at least one sound type of a plurality of sound types, wherein the at least one sound type is indicative of a sound not intended to be included in the communication session;
providing, by the first device and to one of the second or third devices, a message identifying the at least one sound type of the at least one sound;
receiving, by the first device and from the one of the second and third devices, a mute command, wherein the mute command identifies the second device, and each of the first, second, and third devices are configured to generate and receive mute commands; and
responsive to receiving the mute command, causing, by the first device, muting of the second audio data generated by the second device, such that the first and third devices output the first sound and the third sound, respectively, that does not include the second audio data generated by the second device.

2. The method of claim 1, further comprising:
receiving, by the first device, an un-mute command issued by the third device, wherein the un-mute command is used to cancel the muting of the second audio data, and wherein each of the first, second, and third devices are configured to issue un-mute commands.

3. The method of claim 1, further comprising:
responsive to muting the second audio data, graphically indicating that the second device is muted on a graphical user interface of at least one of the first, second, or third devices.

4. The method of claim 1, wherein causing the muting prevents audio data of the second device from being transmitted by the second device to the first device and the other devices associated with the two or more participants engaged in the communication session.

5. A method comprising:
receiving, by a first device through which a first participant of a plurality of participants engages in a communication session, from a second device associated with a second participant of the plurality of participants engaged in the communication session, an indication of at least one sound type of at least one sound included in audio data received from the second device, wherein the at least one sound is identified as the at least one sound type of a plurality of sound types, and wherein the at least one sound type is indicative of a sound not intended to be included in the communication session;
outputting, by the first device and for display by a display device associated with the first participant, a message identifying the at least one sound type of the at least one sound;
receiving, by the first device, a mute command, wherein:
each other participant of the plurality of participants is associated with one or more other devices via which the other participant is engaged in the communication session,
the mute command identifies the second participant of the plurality of participants to be muted, and
any participant of the plurality of participants may issue one or more mute commands at their respective device, wherein the one or more mute commands identify another participant of the plurality of participants; and
responsive to receiving the mute command, causing muting of the second participant for two or more participants engaged in the communication session, wherein the muting prevents audio data from the second device associated with the second participant from being outputted by the one or more other devices associated with the two or more participants engaged in the communication session.

6. The method of claim 5, wherein the first device comprises a server, wherein the devices associated with the two or more participants are communicatively coupled to the server, and wherein the server processes the mute command.

7. The method of claim 5, further comprising:
sending, by the first device, the mute command to the devices associated with the two or more participants, wherein each of the devices associated with the two or more participants processes the mute command.

8. The method of claim 5, further comprising:
responsive to muting the second participant for two or more participants engaged in the communication session, outputting, by the first device and for display by at least one display device associated with the two or more participants, an indication that the first participant muted the second participant.

9. The method of claim 5, further comprising:
outputting, by the first device, for display by a display device of at least one device associated with at least one of the plurality of participants, a message recommending to mute the second participant based on the at least one sound type of the at least one sound of the audio data, a current volume level of the audio data, a historical volume level, a noise status of the audio data, content of the audio data, or timing of the audio data.

10. The method of claim 5, further comprising:
outputting, by the first device, for display by a display device of the second device associated with the second participant, a message indicating that the second participant is muted for the two or more participants engaged in the communication session.

11. The method of claim 5, further comprising:
outputting, by the first device, for display by a display device of the second device associated with the second participant, a message indicating that the mute command has been issued to mute the second participant for the two or more participants.

12. The method of claim 5, further comprising:
receiving, by the first device, a cancel command from the second participant; and
responsive to receiving the cancel command, cancelling, by the first device, the muting of the second participant for the two or more participants.

13. The method of claim 12, wherein cancelling the muting of the second participant for the two or more participants is performed when the cancel command is received within a selected time period of receiving the mute command.

14. The method of claim 5, wherein the first device is associated with the first participant, wherein the first device includes the display device associated with the first participant, and wherein the communication session is a video conference, the method further comprising:
outputting, by the first device, for display by the display device, an indication of a graphical user interface that includes an image corresponding to the second participant;
receiving, by the first device, an indication of a user input selecting the image corresponding to the second participant; and
issuing, by the first device, the mute command identifying the second participant to be muted in response to receiving the indication of user input selecting the image corresponding to the second participant.

15. The method of claim 5, further comprising:
receiving, by the first computing device, a remove command identifying a third participant from at least one participant of the plurality of participants, wherein any participant may issue remove commands; and
responsive to receiving the remove command, removing, by the first computing device, the third participant from the communication session.

16. The method of claim 5, wherein muting the second participant for two or more participants engaged in the communication session further comprises muting the second participant for each of the plurality of participants engaged in the communication session.

17. The method of claim 5, wherein the first device is associated with the first participant, and wherein the communication session is a video conference, the method further comprising:
outputting, by the first device and for display by a display device of the first device, an overlay that includes information related to the communication session.

18. The method of claim 5, wherein the at least one sound as the at least one sound type is identified based on a comparison of the at least one sound to one or more sound profiles, wherein each sound profile of the one or more sound profiles corresponds to a respective sound type from the plurality of sound types.

19. A non-transitory computer-readable storage medium comprising instructions for causing a processor to:
receive, by a first device through which a first participant of a plurality of participants engages in a communication session, from a second device associated with a second participant of a plurality of participants engaged in the communication session, an indication of at least one sound type of at least one sound included in audio data received from the second device, wherein the at least one sound type is indicative of a sound not intended to be included in the communication session;
output, by the first device and for display by a display device associated with the first participant, a message identifying the at least one sound type of the at least one sound;
receive, by the first device, at a a mute command, wherein each participant of the plurality of participants is associated with a respective device of a plurality of devices through which the participant is engaged in the communication session, and wherein
the mute command identifies the second device associated with the second participant to be muted, and
any participant of the plurality of participants may issue mute commands using the respective device of the plurality of devices, wherein the one or more mute commands identify another participant of the plurality of participants; and
responsive to receiving the mute command, causing muting of the second device for two or more participants of the plurality of participants engaged in the communication session, wherein the muting prevents an audio data from the second device from being outputted by the respective device of the plurality of devices associated with each of the two or more participants engaged in the communication session.

20. A device comprising:
a network interface to connect to a communication session having a plurality of participants, wherein each participant of the plurality of participants is associated with a respective device of a plurality of devices through which the participant is engaged in the communication session;
an output device that outputs audio data; and
one or more processors configured to:
identify at least one sound included in first audio data as at least one sound type of a plurality of sound types, wherein the at least one sound type includes a sound not intended to be included in the communication session; and
receive a mute command issued by any participant of the plurality of participants using the respective device associated with the participant, wherein the mute command identifies a participant to be muted, and wherein muting prevents the output device from outputting second audio data from the participant to be muted.

\* \* \* \* \*